(12) United States Patent
Clovis et al.

(10) Patent No.: US 9,705,620 B2
(45) Date of Patent: Jul. 11, 2017

(54) SYNCHRONIZATION OF ENDPOINTS USING TUNABLE LATENCY

(71) Applicant: QUALCOMM Incorporated, San Diego, CA (US)

(72) Inventors: Philip Michael Clovis, San Diego, CA (US); Michael Drop, San Diego, CA (US); Isaac Berk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 14/858,437

(22) Filed: Sep. 18, 2015

(65) Prior Publication Data

US 2017/0085331 A1 Mar. 23, 2017

(51) Int. Cl.
| | | |
|---|---|---|
| *H04J 3/06* | (2006.01) | |
| *H04L 7/033* | (2006.01) | |
| *G06F 13/42* | (2006.01) | |
| *G06F 13/16* | (2006.01) | |

(52) U.S. Cl.
CPC ........ *H04J 3/0658* (2013.01); *G06F 13/1689* (2013.01); *G06F 13/4291* (2013.01); *H04L 7/0331* (2013.01)

(58) Field of Classification Search
CPC .......... H03M 13/1102; H03M 13/258; H03M 13/275; H03M 13/2906; H03M 13/2939; H03M 13/2957
See application file for complete search history.

(56) References Cited

U.S. PATENT DOCUMENTS

| | | | | |
|---|---|---|---|---|
| 5,122,988 | A * | 6/1992 | Graeve | G01R 31/31919 365/219 |
| 5,799,202 | A * | 8/1998 | Rongione | G09G 5/222 345/519 |
| 6,038,643 | A * | 3/2000 | Tremblay | G06F 9/30021 711/132 |
| 6,570,573 | B1 * | 5/2003 | Kazachinsky | G09G 5/363 345/536 |
| 7,203,227 | B1 * | 4/2007 | Currivan | H04L 12/2801 375/222 |
| 8,209,562 | B2 | 6/2012 | Defazio et al. | |
| 8,565,033 | B1 | 10/2013 | Manohararajah et al. | |

(Continued)

FOREIGN PATENT DOCUMENTS

WO WO-2010080172 A1 7/2010

OTHER PUBLICATIONS

International Search Report and Written Opinion—PCT/US2016/049755—ISA/EPO—Dec. 7, 2016.

*Primary Examiner* — Khaled Kassim
*Assistant Examiner* — Syed S Ali
(74) *Attorney, Agent, or Firm* — Haynes and Boone, LLP

(57) ABSTRACT

A memory controller is provided to increment a source timestamp count responsive to a clock signal. Further, the memory controller associates the source timestamp count to a respective word for each endpoint in a plurality of endpoints. The memory controller transmits the received clock signal, a respective data word, and an associated source count to each endpoint. Each endpoint increments a destination count responsive to the clock signal. Each endpoint further transmits its respective word to an external memory responsive to the destination count being greater than or equal to the associated source count by a threshold margin.

18 Claims, 3 Drawing Sheets

(56) References Cited

U.S. PATENT DOCUMENTS

| | | |
|---|---|---|
| 8,565,034 B1 | 10/2013 | Lu et al. |
| 9,021,293 B2 | 4/2015 | Lee et al. |
| 2003/0115238 A1* | 6/2003 | O'Connor ............ G06F 9/30021 718/100 |
| 2005/0083358 A1* | 4/2005 | Lapstun ................. B41J 2/0452 347/5 |
| 2005/0207480 A1* | 9/2005 | Norsworthy ....... H03H 17/0614 375/219 |
| 2011/0004793 A1* | 1/2011 | Sul ........................ G11C 29/003 714/718 |
| 2011/0204932 A1* | 8/2011 | Cortadella ................ G06F 7/00 327/145 |
| 2014/0089718 A1 | 3/2014 | Kain |
| 2014/0281325 A1 | 9/2014 | Meaney et al. |
| 2014/0325107 A1 | 10/2014 | Iwatsuki |

\* cited by examiner

SYNCHRONIZATION OF ENDPOINTS USING TUNABLE LATENCY

TECHNICAL FIELD

This application relates to the synchronized transmission of data from a number of endpoints of an integrated circuit to a remote memory on a separate integrated circuit.

BACKGROUND

System on a chip (SoC) integrated circuits may have its memory controller centrally located on the SOC die whereas the endpoints (I/O circuits) that interface with an external memory may be located on the die periphery. Given this separation between the memory controller and the endpoints, synchronization of data across the endpoints becomes increasingly more difficult. For example, during a write operation to the external memory such as to a dynamic random access memory (DRAM, the memory controller launches data words and a clock to the endpoints. The data words must arrive relatively synchronously at each endpoint to conform to the strict timing requirements of the external memory. In particular, each of the endpoints may be required to send data words to the DRAM on the same clock cycle or clock edge. This timing requirement represents numerous challenges and problems that may be better appreciated with reference to an example conventional SOC 100 shown in FIG. 1.

In SOC 100, a memory controller 105 transmits data to a number of endpoints including an endpoint 115 and an endpoint 120. Since endpoints 115 and 120 then launch the data to an external memory, they are located at the periphery of SOC 100 (endpoints 115 and 120 may represent just a subset of the total endpoints for illustration clarity). A clock source such as a phase-locked loop (PLL) 110 is located proximate to the endpoints 115 and 120. Given this proximity, PLL 110 transmits a clock signal that arrives relatively synchronously at each endpoint 115 and 120. In contrast to this proximity of PLL 110 to endpoints 115 and 120, memory controller 105 is centrally located on the die and is thus relatively distant from PLL 110, which also sends the clock signal across the SOC 100 to memory controller 105. Memory controller 105 then re-transmits the clock on a separate clock path to each endpoint 115 and 120. In addition, memory source 105 launches data (e.g., data words) on separate data paths to each endpoint 115 and 120. The endpoints register the launched data according to an edge of the clock received from memory controller 105 and retransmit the data to an external memory (not illustrated) responsive to an edge of the clock received from PLL 110.

Since memory controller 105 is typically located in a central region of the SOC 100, each endpoint's clock path and data path must traverse a relatively large distance of the SOC die to extend from memory controller 105 to the respective endpoints. By traversing across such relatively long paths, the clock and data carried on these path will be subject to a number of respective variations (e.g., device variations, temperature changes, voltage noise, jitter, path length, etc.) that may be unique to a given data path or clock path. As such, respective data words and the corresponding clock may arrive at each of the endpoints 115 and 120 asynchronously, thereby creating data alignment issues with the strict timing requirements of the external memory. It is thus conventional to carefully align and electrically match the data and clock paths for endpoint 115 to endpoint 120 to so minimize this asynchronicity. But this alignment is expensive and cumbersome to implement.

Accordingly, there is a need in the art for improving the synchronization of endpoints.

SUMMARY

A system is provided including a plurality of endpoints in which each endpoint includes a first-in-first-out (FIFO) buffer configured to store data words received from a memory controller. Each endpoint also includes a destination counter configured to count a destination count responsive to a clock signal received from a clock source. In addition, each endpoint includes a logic circuit configured to compare the destination count to a source count associated with a first-in one of the data words in the endpoint's FIFO buffer so that the endpoint's FIFO buffer may retrieve the first-in data word responsive to the clock signal received from the clock source when the logic circuit's comparison indicates that a sufficient delay has occurred since the endpoint's FIFO buffer stored the first-in data word. The sufficient delay accounts for the asynchronicity between the FIFO buffers such that the retrieval of the data words from the FIFO buffers is synchronous despite this asynchronicity.

These advantageous features may be better appreciated with reference to the following detailed description.

BRIEF DESCRIPTION OF THE DRAWINGS

Embodiments of the disclosed endpoint synchronization architectures and their advantages are best understood by referring to the detailed description that follows. It should be appreciated that like reference numerals are used to identify like elements illustrated in one or more of the figures.

DETAILED DESCRIPTION

Figure 1:
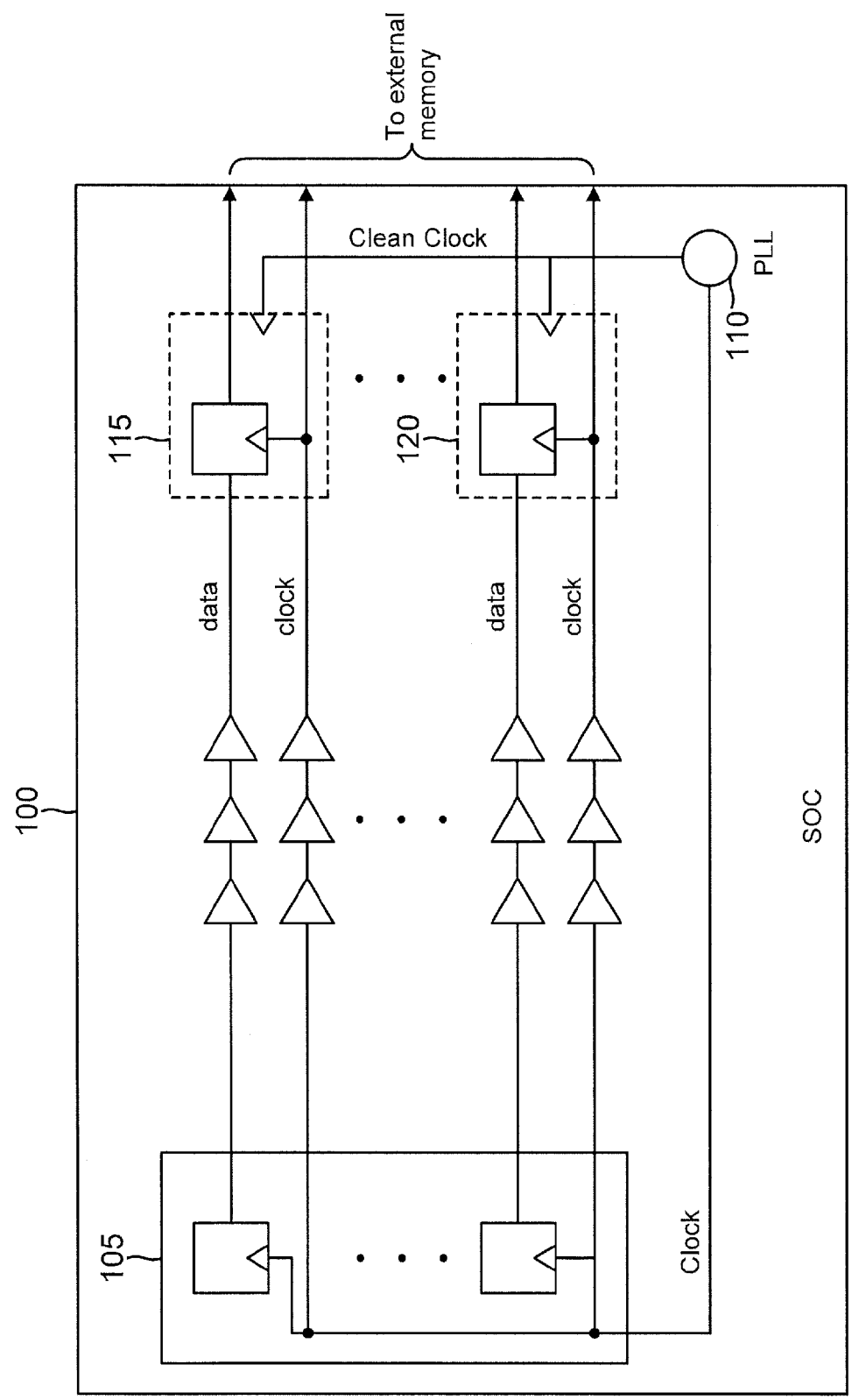
FIG. 1 is a schematic for a conventional source synchronous SOC with multiple endpoints.

A solution is provided to the problem of synchronizing endpoints with regard to receiving data and a clock from a relatively remote memory controller that does not require expensive balancing and matching of the clock and data paths. To provide such an advantageous solution, a data source such as a memory controller is provided with a source counter that increments a source count responsive to edges of a clock received from a clock source proximate a plurality of endpoints. For a given edge of the clock, there is thus a corresponding source count at the memory controller. The memory controller tags each data word being transmitted to the endpoints with the corresponding source count. For example, the memory controller may append the corresponding source count as a header to each data word.

Given this tagging, an example data transmission to a specific endpoint may occur as follows. Suppose that the source count equals one by way of example. The memory controller then tags the endpoint's data word with the source count and transmits the "one" tagged data word to the endpoint. At a subsequent clock edge as received at the memory controller from the clock source, the source count is incremented to two so that the memory controller transmits a "two" tagged data word to the endpoint. The subsequent data word transmission would have a source tag of three, followed by source tag of four, and so on. To limit the bandwidth demands that would be associated with incrementing the source count to a relatively large number, the counter in the memory controller may be configured to count in a modulo-n fashion such that it increments the source count to a maximum positive integer of n and then starts the count over again from a starting value such as zero. To exploit this tagging, each endpoint may include a first-in-first-out (FIFO) memory. A destination counter in each endpoint is analogous to the source counter in the memory controller and thus increments a destination count responsive to edges in the clock received from the clock source. By comparing the destination count to the source count for the first-in word in its FIFO buffer, the endpoints may be synchronized as explained further herein.

As known in the FIFO arts, each endpoint FIFO buffer loads received data words from the memory controller in a "push" operation. This push occurs responsive to an edge of the retransmitted clock launched from the memory controller over the clock path associated with each data path. Conversely, each endpoint FIFO buffer retrieves the first-in data word in a "pop" operation responsive to an edge of the clock received from the clock source at the endpoint FIFO buffer. However, the first-in data word is only popped if the destination count is greater than or equal to a sum of the first-in data word's source count and a threshold margin. As discussed further herein, the threshold margin accounts for the asynchronicity of the retransmitted clocks from the memory controller as received at the endpoints as compared to the clock received at the endpoints directly from the clock source.

This asynchronicity is due to both the relatively long clock path between the clock source and the memory controller and the relatively long path clock between the memory controller and the endpoints. The retransmitted clock received at each endpoint from the memory controller is thus out of phase with and subject to jitter as compared to the clock as received at each endpoint directly from the clock source. In contrast, the clock source is relatively close to the endpoints such that the corresponding received clock signal at each endpoint from the clock source is substantially in-phase with the analogous received clock signal at the remaining endpoints. The retransmitted clock from the memory controller as received at the endpoints may thus be denoted as a "dirty" clock whereas the clock received at the endpoints from the clock source is a "clean" clock. The dirty clock is subject to jitter and other error sources whereas the clean clock is received relatively synchronously at the endpoints with significantly less jitter. The endpoint jitter with regard to launching the data word to the external DRAM must meet the DRAM specifications.

The threshold margin discussed above accounts for the jitter and other errors in the dirty clock received at the endpoints. For example, suppose that the clock source transmits a clock edge to the endpoints. This same clock edge is also transmitted to the memory controller so that it may be retransmitted from the memory controller along with the corresponding tagged data words to the endpoints. If the worst case delay between the registration of data words having the same source count in the endpoints is four clock cycles (note that the length of the clock period for the clean clock and the dirty clock are identical but for the jitter in the dirty clock), then the threshold margin should span this four clock cycles of delay. In addition, the threshold margin may account for the source and destination counter mismatch as well.

Regardless of how many clock cycles the worst-case delay spans, the threshold margin may be adjusted accordingly. Each endpoint examines the source count of the oldest data word in its FIFO buffer. Should the destination count for a given edge of the clean clock indicate that the threshold margin is satisfied with regard to the source count of the oldest data word, the endpoint's FIFO pops this oldest data word accordingly. Since the threshold margin is satisfied, all the endpoints will synchronously pop the corresponding data word at the given edge of the clean clock. This is quite advantageous in that the clock and data paths from the memory controller to the endpoints need not be carefully balanced with respect to each other. Instead, a more relaxed design (and thus lower cost design) may be used in which these clock and data paths are not electrically matched to each other. Despite this lack of balance, the endpoints are synchronized because each endpoint's FIFO will only pop its first-in data word when the destination count indicates that the delay period corresponding to the threshold margin has expired.

The source count represents a local time as indicated by the corresponding edge of the source clock as received at the memory controller. Each endpoint must wait from this time as represented by the first-in data word's source count over the delay period corresponding to the threshold margin. To do so, each endpoint compares the destination count to the first-in data word's source count. If the destination count is greater than or equal to a sum of the first-in data word's source count and the threshold margin, the endpoint's FIFO buffer pops the first-in data word. As discussed earlier, this pop operation is responsive to cycles of the clean clock received at each endpoint's FIFO buffer. For implementations in which the source count and the destination counts are incremented in a modulo-n fashion, the sum of the first-in data word's source count and the threshold margin is a modulo-n sum.

Figure 2:
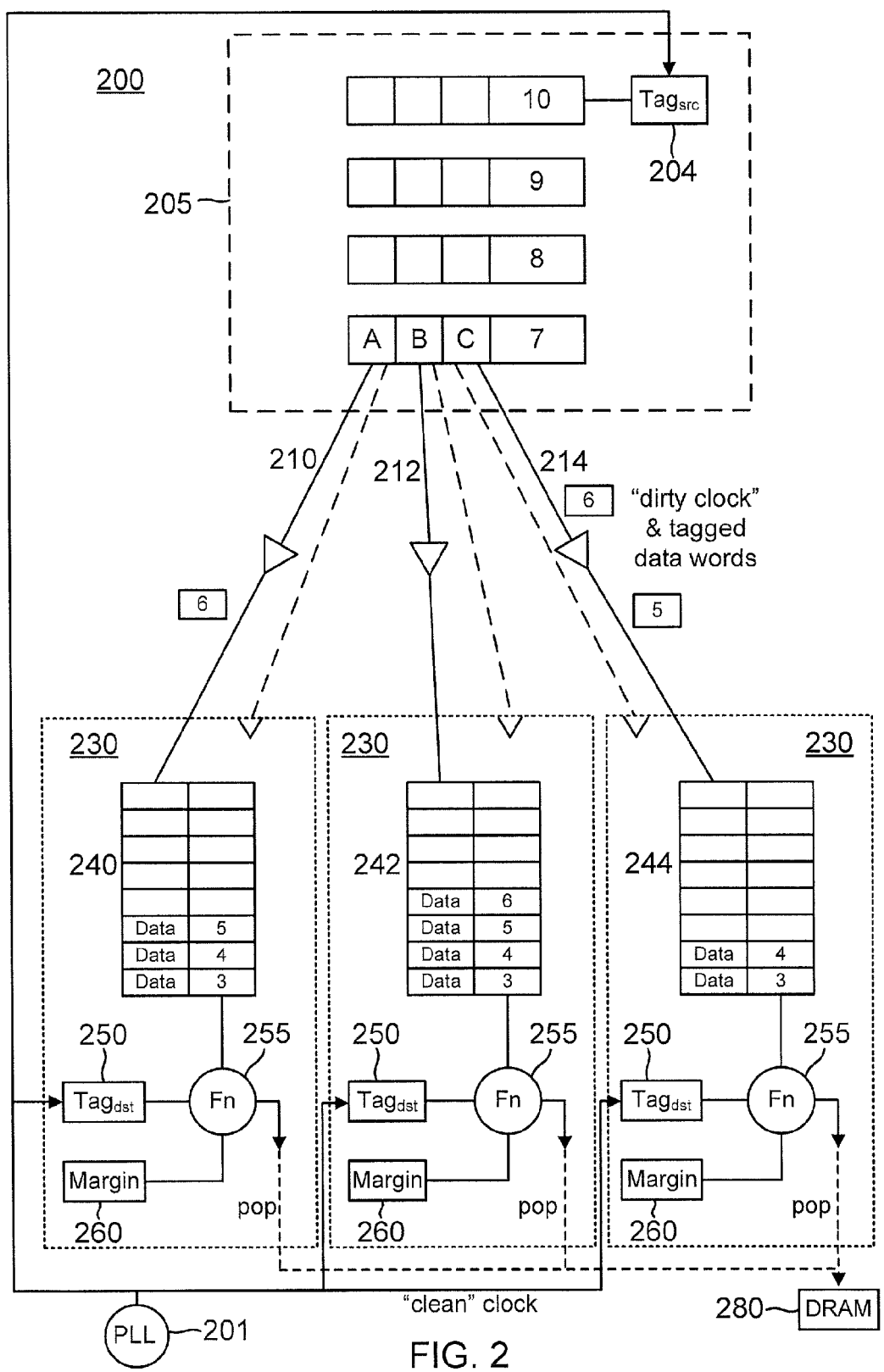
FIG. 2 illustrates endpoint synchronization architecture in accordance with an embodiment of the disclosure.

An example SOC 200 is shown in FIG. 2. A memory controller 205 may be centrally positioned within SOC 200 as described above with regard to memory controller 105 of FIG. 1. Similarly, a plurality of endpoints 230 may be positioned on the perimeter of SOC 200 as described with regard to endpoints 115 and 120 of FIG. 1. For illustration clarity, only three endpoints 230 are illustrated but it will be appreciated that greater (or fewer) numbers of endpoints may be used in alternative implementations. Memory controller 205 is thus located relatively remotely from endpoints 230. In contrast, a clock source such as a phase-locked loop (PLL) 201 is located relatively close to endpoints 230 on the semiconductor die in which SOC is integrated. A clock signal from PLL 201 will thus arrive relatively synchronously at endpoints 230 due to the relatively short propagation paths between PLL 201 and endpoints 230. In contrast, the clock signal from PLL 201 must travel the relatively long distance between memory controller 205 and PLL 201 and then be retransmitted from memory controller 205 to the various endpoints 230. The retransmitted clock as received at endpoints 230 will thus be subject to jitter and phasing errors due to this extended propagation such that it may be denoted as a "dirty" clock whereas the clock signal received at endpoints 230 directly from PLL 201 may be denoted as the "clean" clock.

Memory controller 205 includes a source counter 204 for counting a source count responsive to edges of the clock received from PLL 201. For illustration purposes, four consecutive source counts are shown in memory controller 205, starting from a source count 7 to a source count 10. Responsive to these received clock edges, memory controller 205 transmits a tagged data word to each endpoint 230. For example, at the received clock edge corresponding to source count 7, memory controller transmits a tagged data word A over a data path 210 to a first one of endpoints 230, a tagged data word B over a data path 212 to a second one of endpoints 230, and a tagged data word C over a data path 214 to a third one of endpoints 230. Each tagged data word is tagged with the corresponding source count, which in this example is a source count of 7. In actual operation, memory controller 205 need not accumulate tagged data words over multiple clock edges: the illustrated accumulation of data words and corresponding source counts 7 through 10 in memory controller 205 is thus shown merely for conceptual purposes. In practice, memory controller 205 may instead transmit the tagged data words responsive to the corresponding clock edge that incremented the source count. In other words, after incrementing the source count, memory controller 205 may then tag the corresponding data words with the source count and transmit them to endpoints 230 prior to the next received clock edge at memory controller 205. Memory controller 205 also transmits the received clock to endpoints 230 over corresponding clock paths (these clock paths are indicated with dotted lines in FIG. 2 for illustration clarity). Like the data paths, the clock paths may be buffered to maintain sufficient signal strength over the relatively long propagation distances between memory controller 205 and endpoints 230.

Given these long propagation distances, the transmitted data words may travel asynchronously due to the variations described above. In that regard, there are device variations, errors from voltage noise, temperature variations, path length, and additional factors that contribute to this skew among the data paths 210, 212, and 214 as well as a similar skew among the corresponding clock paths. For example, data path 212 in SOC 200 supports a lower propagation latency than data path 210, which in turn supports a lower propagation latency than data path 214. Due to these differences, the data words will arrive asynchronously at the endpoints. For example, consider the point in time at which source counter 204 in memory controller 205 has incremented the source count to 7. At this point in time, memory controller 205 has already transmitted the data words tagged with source counts 3, 4, 5, and 6. Since data path 212 is relatively fast, the data words with source tags 6, 5, 4, and 3 that were transmitted from memory controller 205 over data path 212 to the second one of endpoints 230 are already registered in its corresponding FIFO 242. At the same time, however, a data word with source tag 6 is still propagating over data path 210 to the first one of endpoints 230. A corresponding FIFO 240 coupled to data path 210 will thus only register the data words having source tags 5, 4, and 3 at this point in time. Similarly, the data words with source tags 5 and 6 are still propagating on data path 214 to the third one of endpoints 230 at this point in time. A FIFO 244 coupled to data path 214 will thus have registered only the data words with source tags 3 and 4 at this point in time.

Despite this asynchronicity, each endpoint's FIFO can pop its first-in data word (in this example, the data word with source tag 3) synchronously because each endpoint includes a destination counter 250 for counting a destination count responsive to edges of the received clock from PLL 201. Each endpoint also includes a logic circuit 255 configured to form a sum of the source count that was tagged to the first-in data word in the endpoint's FIFO with a threshold margin 260. Each endpoint's logic circuit 255 is further configured to compare its sum to the destination count from the endpoint's destination counter 250. If this comparison indicates that the destination count is greater than or equal to the sum, the logic circuit 255 triggers the endpoint's FIFO to pop its first-in (oldest) data word. Like source counter 204, destination counters 250 may each be configured to count in a modulo-n fashion, where n would be the same positive plural integer used for the modulo-n counting in source counter 204. Similarly, the sum calculated by each logic circuit 255 may be calculated using modulo-n addition. The resulting pop by each endpoint's FIFO is thus synchronous despite the asynchronous loading (push operations) of the FIFOs with respect to each other. In this fashion, latency is used at each endpoint to free SOC 200 from the expensive and burdensome task of carefully balancing the various data paths and clock paths between memory controller 205 and endpoints 230. Nor is there any need in SOC to enable communication and/or feedback among endpoints 230 to synchronize the pop operations.

Threshold margin 260 may depend on the asynchronicity, propagation times, and/or delays associated with data words and clock signals transmitted from memory controller 205 to each of the endpoints 230. Further, threshold margin 260 may depend on the asynchronicity between the FIFOs 240, 242, and 244 separately or in combination with the propagation times and/or delays, among other factors described herein. In addition, threshold margin may account for the delay difference between the receipt of a clock edge from PLL 201 at memory controller 205 as compared to the receipt of the same clock edge at endpoints 230. For example, suppose the worst-case skew or delay between the fastest push operation for the FIFOs versus the slowest push operation the FIFOs is five edges of the clean clock signal received from the PLL 201. Thus, for the FIFOs 240, 242, and 244 to transmit their respective data words with the time-stamp of n, each FIFO may wait for n+5 edges of the clean clock before transmitting the respective data word to an external memory such as a DRAM 280. Setting threshold margin 260 to equal 5 in such an implementation would thus ensure the synchronicity of the resulting pop operations. For illustration clarity, the DRAM 280 is illustrated as receiving only the retrieved data word from just one endpoint 230. The transmission from the remaining endpoints 230 occurs analogously. In addition, DRAM 280 would receive the clock signal from PLL 201 as received at each endpoint 230. The transmission of the clock signal to DRAM 280 is not shown for illustration clarity.

A training session may be implemented to determine threshold margin 260 based on a number of clock cycles of the clean clock signal required for each of the endpoints 230 to receive one or more of specific training data words. Each endpoint 230 may use the same threshold margin 260. After this training session, source counter 205 and destination counters 250 may all reset responsive to a reset signal while the output clock from PLL 201 is blocked or stopped. With the release of the reset signal, the output clock PLL 201 may resume cycling so that source counter 205 and destination counters 250 may begin incrementing.

The comparison performed by each endpoint's logic circuit 255 may be represented by the following function denoted as Fn(pop) to determine when the endpoint's FIFO's oldest data word is to be popped:

$$Fn(pop)=Tag_{dst} \geq (Tag_{src}+\text{Threshold Margin 260})$$

where Tagdst is the destination count and Tagsrc is the source count. The oldest data word is thus popped from each endpoint 230 when the endpoint's destination count ($Tag_{dst}$) is greater than or equal to a sum of the source count ($Tag_{src}$) and the threshold margin 260.

Threshold margin 260 may be determined using the following expression:

$$\text{Threshold Margin } 260 > \text{Error}_{tagdst\text{-}tagsrc} + (\text{Max}-\text{Min}) + \text{Added Margin} + \text{FIFO}_{async}$$

Each factor used in the above expression for threshold margin 260 is expressed in terms of the clock period (assuming a single clock edge is used) for the clean clock. The "$\text{Error}_{tagdst\text{-}tagsrc}$" term represents the delay between incrementing the destination counters 250 as compared to incrementing source counter 204. The "Added Margin" is an additional margin to provide an assurance that all FIFOs will have a data word to be popped when the function "Fn(PoP)" is satisfied. The "(Max−Min)" term represents the difference between the maximum delay (e.g., from the slowest path 214) and the minimum delay (e.g., from the fastest path 212). The "$\text{FIFO}_{async}$" is the delay between FIFOs 240, 242, and 244 with regard to their pop operations. Note that the $\text{FIFO}_{async}$ term would only be applied if the FIFO has a minimum number of data entries prior to a pop operation.

For example suppose that $\text{Error}_{tagdst\text{-}tagsrc}=1$, (Max−Min)=2, the added margin=1, and $\text{FIFO}_{async}=1$. In such an example, the Fn(pop) expression may be represented by the following expression:

$$Fn(pop) = Tag_{dst} \geq Tag_{src} + 5$$

Thus, once the destination timestamp count is greater than or equal to the source destination timestamp count by the threshold margin of 5, the oldest data word from each of the endpoints 230, 232, and 234 will pop synchronously because each of the FIFOs 240, 242, and 244 has the respective data word with the source timestamp count of 3 ready to be popped off. In this fashion, data words will be launched or transmitted synchronously from the FIFOs 240, 242, and 244 despite the asynchronous loading of the data words into the FIFOs.

Figure 3:
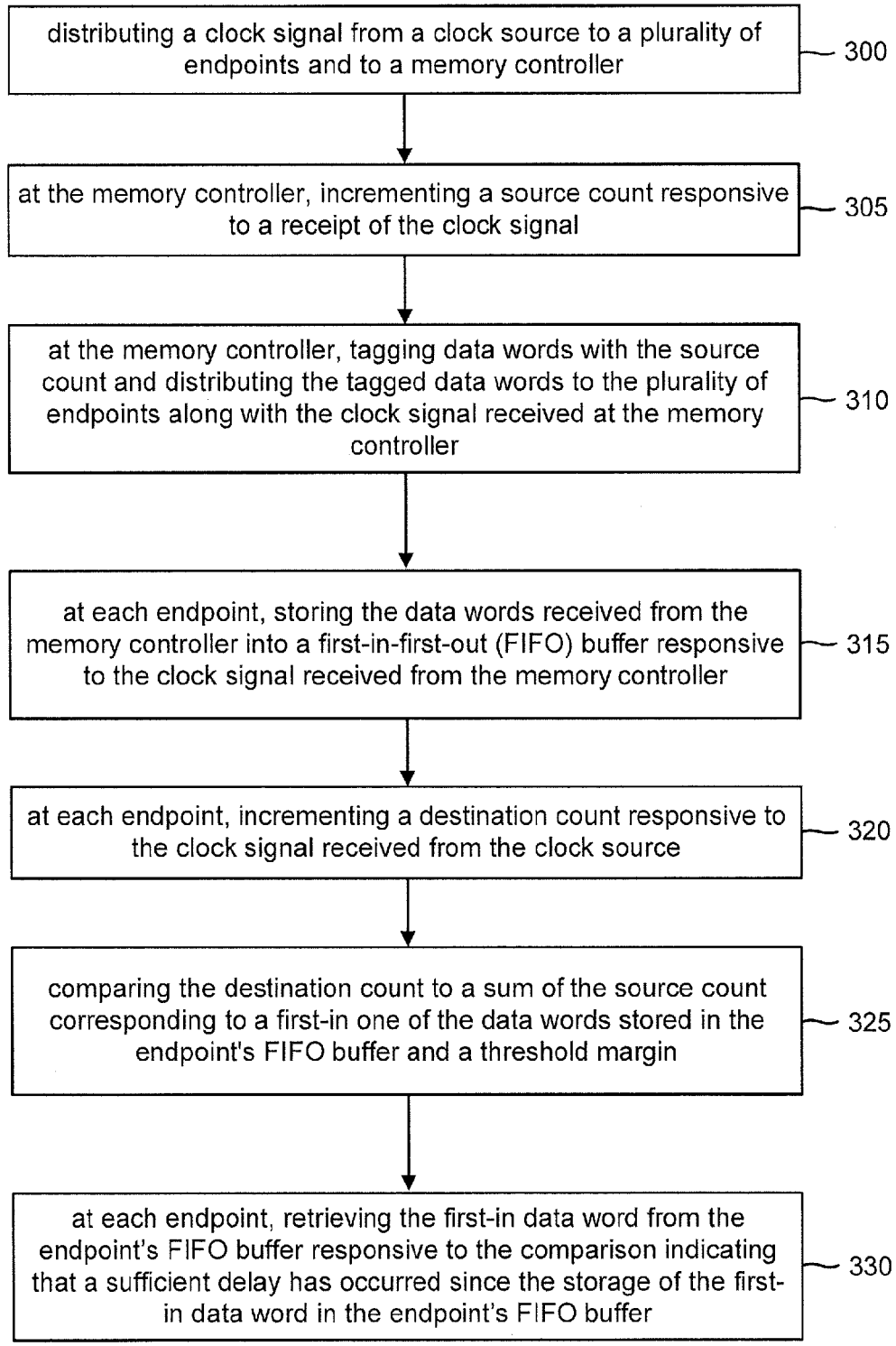
FIG. 3 is a flowchart of an example method of operation in accordance with an embodiment of the disclosure.

An example method of operation for synchronizing endpoints using tunable latency will now be addressed with reference to the flowchart shown in FIG. 3. An act 300 comprises distributing a clock signal from a clock source to a plurality of endpoints and to a memory controller. The distribution of the clock signal from PLL 201 to memory controller 205 and to endpoints 230 discussed with regard to FIG. 2 is an example of act 300. An act 305 is performed at the memory controller and comprises incrementing a source count responsive to a receipt of the clock signal. The incrementing at source counter 204 discussed with regard to FIG. 2 is an example of act 305. The method also includes an act 310 that is performed at the memory controller and comprises tagging data words with the source count and distributing the data words to the plurality of endpoints along with the clock signal received at the memory controller. The tagging of data words and their subsequent distribution to endpoints 230 along with the clock signal received at the memory controller discussed with regard to FIG. 2 is an example of act 310. An act 315 is performed at each endpoint and comprises storing the data words received from the memory controller into a first-in-first-out (FIFO) buffer responsive to the clock signal received from the memory controller. The storing of the tagged data words into FIFOs 240, 242, and 244 discussed with regard to FIG. 2 is an example of act 315. The method further includes an act 320 performed at each endpoint that comprises incrementing a destination count responsive to the clock signal received from the clock source. The incrementing of the destination count at any of destination counters 250 discussed with regard to FIG. 2 is an example of act 320. Another act 325 performed after each increment of the destination count at each endpoint comprises comparing the destination count to a sum of the source count corresponding to a first-in one of the data words stored in the endpoint's FIFO buffer and a threshold margin. The comparison by logic circuits 255 discussed with regard to FIG. 2 is an example of act 325. Finally, an act 330 performed at each endpoint comprises retrieving the first-in data word from the endpoint's FIFO buffer responsive to the comparison indicating that a sufficient delay has occurred since the storage of the first-in data word in the endpoint's FIFO buffer. The pop operation by any of FIFO buffers 240, 242 and 244 is an example of act 330.

It should also be noted that the example embodiments described above may be applied in numerous other implementations and the examples above should not be interpreted as limiting. For example, the data words transmitted and received may be of various widths and the number of data bits per word may be increased or decreased depending on the implementation. As such, the source timestamp count and the destination timestamp count may be any suitable number of bits. As noted, for purposes of examples and illustration, a data word may be 8 bits and the associated source timestamp count may be 4 bits depending on the implementation.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A host integrated circuit, comprising:
 a clock source;
 a memory controller;
 a plurality of endpoints, each endpoint including a first-in-first-out (FIFO) buffer configured to store data words received from the memory controller, wherein each endpoint includes a modulo-n destination counter configured to increment a destination count responsive to a clock signal received from the clock source, wherein n is a positive integer, and wherein each endpoint includes a logic circuit configured to compare the destination count to a source count associated with a first-in one of the data words in the endpoint's FIFO buffer, and wherein the endpoint's FIFO buffer is configured to retrieve the first-in data word responsive to the clock signal received from the clock source when the comparison indicates that a sufficient delay has occurred since the endpoint's FIFO buffer stored the first-in data word, and wherein the clock source, the memory controller, and the plurality of endpoints are integrated onto a semiconductor die, and wherein the endpoints are located on an edge portion of the semiconductor die and the source clock is located closer to the plurality of endpoints on the semiconductor die than to the memory controller.

2. The host integrated circuit of claim 1, wherein the clock source comprises a phase-locked loop (PLL).

3. The host integrated circuit of claim 1, wherein each endpoint is configured to transmit the retrieved first-in data word from its FIFO buffer to an external memory.

4. The host integrated circuit of claim 3, wherein the external memory comprises a dynamic random access memory (DRAM).

5. The host integrated circuit of claim 1, wherein the memory controller includes a source counter configured to increment the source count responsive to a clock signal received from the clock source, and wherein the memory controller is configured to append the source clock to each data word before transmitting the data words to the endpoints responsive to the clock signal received from the clock source.

6. The host integrated circuit of claim 5, wherein the source counter is further configured to increment the source count responsive to a rising edge of the clock signal received from the clock source.

7. The host integrated circuit of claim 5, wherein the source counter is a modulo-n source counter.

8. The host integrated circuit of claim 1, wherein each endpoint's logic circuit is configured to add the source count associated with the first-in data word in the endpoint's FIFO buffer with a threshold margin to form a sum and to determine whether the destination count is greater than or equal to the sum to indicate that the sufficient delay has occurred since the endpoint's FIFO buffer stored the first-in data word.

9. The host integrated circuit of claim 1, further comprising:
a plurality of data paths corresponding to the plurality of endpoints, wherein each data path extends from the memory controller to the corresponding endpoint; and
a plurality of clock paths corresponding to the plurality of endpoints, wherein each clock path extends from the memory controller to the corresponding endpoint.

10. A method, comprising:
distributing a clock signal from a clock source to a plurality of endpoints and to a memory controller;
at the memory controller, incrementing a source count responsive to a receipt of the clock signal;
at the memory controller, tagging data words with the source count and distributing the tagged data words to the plurality of endpoints along with the clock signal received at the memory controller;
at each endpoint, storing the data words received from the memory controller into a first-in-first-out (FIFO) buffer responsive to the clock signal received from the memory controller;
at each endpoint, modulo-n incrementing a destination count responsive to the clock signal received from the clock source, wherein n is a positive integer;
after each increment of the destination count at each endpoint, comparing the destination count to a sum of the source count corresponding to a first-in one of the data words stored in the endpoint's FIFO buffer and a threshold margin; and
at each endpoint, retrieving the first-in data word from the endpoint's FIFO buffer responsive to the comparison indicating that a sufficient delay has occurred since the storage of the first-in data word in the endpoint's FIFO buffer, wherein the clock source, the memory controller, and the plurality of endpoints are integrated onto a semiconductor die, and wherein the endpoints are located on an edge portion of the semiconductor die and the source clock is located closer to the plurality of endpoints on the semiconductor die than to the memory controller.

11. The method of claim 10, further comprising transmitting the retrieved first-in data word from each endpoint's FIFO buffer to an external memory.

12. The method of claim 11, wherein transmitting the retrieved first-in data word from each endpoint's FIFO buffer comprises transmitting the retrieved first-in data word to a DRAM.

13. The method of claim 10, further comprising:
at each endpoint, determining if the destination count is greater than or equal to the sum to determine whether the sufficient delay has occurred since the storage of the first-in data word in the endpoint's FIFO buffer.

14. The method of claim 13, further comprising transmitting a series of training data words from the memory controller to the endpoints to determine the threshold margin.

15. The method of claim 10, further comprising:
stopping the distribution of the clock signal to the memory controller and to the plurality of endpoints;
while the distribution of the clock signal to the memory controller and to the plurality of endpoints is stopped, resetting the source count and each destination count; and
resuming the distribution of the clock signal to the memory controller and to the plurality of endpoints.

16. An integrated circuit, comprising:
a clock source configured to source a clock signal;
a plurality of endpoints, each endpoint having a clock path to receive the clock signal;
a memory controller configured to increment a source timestamp count responsive to a receipt of the clock signal over a memory controller clock path that couples the clock source to the memory controller; the memory controller being further configured to associate the source timestamp count with a respective data word for each endpoint, and to retransmit the received clock signal, the respective data word, and the associated source timestamp count to each endpoint;
wherein each endpoint comprises means for modulo-n incrementing a destination timestamp count responsive to a receipt of the clock signal over the endpoint's clock path and for transmitting the respective data word to an external memory responsive to the destination timestamp count being greater than or equal to the associated source timestamp count by a threshold margin, wherein n is a positive integer, and wherein the clock source, the memory controller, and the plurality of endpoints are integrated onto a semiconductor die, and wherein the endpoints are located on an edge portion of the semiconductor die and the source clock is located closer to the plurality of endpoints on the semiconductor die than to the memory controller.

17. The integrated circuit of claim 16, wherein each endpoint is configured to receive its respective word from the memory controller at different times.

18. The integrated circuit of claim 16, wherein the integrated circuit is configured to determine the threshold margin based on a number of clock cycles of the clock signal required for each of the plurality of endpoints to receive one or more of the respective words.

* * * * *